(12) United States Patent
Jaw

(10) Patent No.: US 6,519,943 B2
(45) Date of Patent: Feb. 18, 2003

(54) ENGINE STALL AND DISTORTION SUPPRESSION SYSTEM

(75) Inventor: Link C. Jaw, Scottsdale, AZ (US)

(73) Assignee: Scientific Monitoring Inc.

( * ) Notice: Subject to any disclaimer, the term of this patent is extended or adjusted under 35 U.S.C. 154(b) by 0 days.

(21) Appl. No.: 10/228,664

(22) Filed: Aug. 26, 2002

(65) Prior Publication Data

US 2003/0005703 A1 Jan. 9, 2003

Related U.S. Application Data

(63) Continuation of application No. 09/527,980, filed on Mar. 16, 2000, now Pat. No. 6,438,960.

(51) Int. Cl.⁷ ............................................... F02C 7/04
(52) U.S. Cl. ........................................ 60/772; 60/726
(58) Field of Search ................................ 60/39.29, 726, 60/772; 137/15.1, 15.2; 415/11, 58.4, 58.5, 151

(56) References Cited

U.S. PATENT DOCUMENTS

| | | | |
|---|---|---|---|
| 4,154,256 A | 5/1979 | Miller | 137/15.1 |
| 4,550,564 A | 11/1985 | Callahan et al. | 60/39.093 |
| 5,275,528 A | 1/1994 | Freeman et al. | 415/1 |
| 5,448,881 A | 9/1995 | Patterson et al. | 60/39.29 |
| 5,557,917 A | 9/1996 | Jaw | 60/39.02 |

Primary Examiner—Louis J. Casaregola
(74) Attorney, Agent, or Firm—The Halvorson Law Firm

(57) ABSTRACT

A method for equalizing fluid pressure in a primary fluid flow region, comprised of providing a modulating fluid flow region adjacent to the primary flow region and separating the two regions with a perforated wall. By controlling the fluid pressure in the modulating fluid flow region, and permitting fluid to flow between the perforated wall, the fluid pressure in the primary fluid flow region is equalized. The perforations may be formed either in at least one ring about the perimeter of the plenum or at least one row along the longitudinal direction of the plenum. Furthermore, at least one of the perforations may be canted in either the longitudinal or radial directions. This method is important in equalizing the air pressure in a turbine engine air inlet and thereby avoiding aerodynamic distortions in said inlet. Additionally, an apparatus is provided for equalizing the pressure in a primary fluid flow region.

12 Claims, 5 Drawing Sheets

Longitudinal Axis

Longitudinal Axis

ENGINE STALL AND DISTORTION SUPPRESSION SYSTEM

This application is a continuation U.S. Pat. No. 6,438,960, which issued on Aug. 2, 2002, Ser. No. 09/527,980 and filed on Mar. 16, 2000.

FIELD OF THE INVENTION

The present invention relates to a novel apparatus for causing pressure equalization between flow masses in two regions, and a method for achieving said equalization. The apparatus utilizes a wall or surface between the flow masses, said surface containing a plurality of perforations, and achieves equalization by the exchange of flows through the perforations.

BACKGROUND

The need to equalize fluid flow in a given region is well known. The term "fluid" in this instance may refer to air, gas, or liquid. One of the most important applications of equalizing flow is in the area of turbine engines to diminish flow distortions or the occurrence of compressor surge and rotating stall.

Gas turbine engines require high performance and high reliability in order to assure that flights can be completed effectively, efficiently and safely. This is especially true in military applications. Air is forced through the inlet or mouth of a turbine engine and from there directed into a compressor. As the flow in the compressor is reduced or made non-uniform while the compressor or rotational speed is held constant, a point will be reached at which some or all of the engine blades begin to stall and engine instabilities occur. The most violent of these is "surge", which for high speed compressors (as in a turbine engine) can result in periodically reversed flow and mechanical damage. The other result of air being reduced or made non-uniform is rotating stall. "Stall" can result in a region of blocked flow covering half of the circumference of the engine inlet and rotating at half the rotor speed, and may lock the engine.

When a gas turbine engine experiences a compressor "stall" or "surge", the given flight will be effected. In cases of severe surge, the engine or drive train components can fail, causing loss of engine operation. When this happens in flight, the results can be catastrophic. Similarly, a rotating "stall" can lock or freeze an engine resulting in loss of operation. For an in depth discussion of how a turbine engine works, and turbine engine surge and stall, see Emmons, H. W., Pearson, C. E., and Grant, H. P.; "Compressor Surge and Stall Propagation," Transactions of the ASME, May, 1955, p. 455–469; and Greitzer, E. M., "The Stability of Pumping Systems—the 1980 Freeman Scholar Lecture," ASME J. of Fluids Engineering, June., 1981, vol. 103, p. 193–242.

Surge and stall are commonly caused by: (1) engine deterioration; (2) aerodynamic distortions (especially at the air inlet); and (3) hot gas injection (from weapon firing). Despite the knowledge of these causes, there has been little success in providing turbine engines with any reliable way of preventing engine surge or stall.

The present invention addresses cause number (2), and teaches a way to create a flow of air into a turbine engine which is uniform in pressure around the circumference of the engine inlet. As air enters an engine inlet, any variations in pressure at different points around the circumference of the inlet create aerodynamic disturbances and mechanical stress, hence inefficiencies in the engine. If the introduced air is non-uniform in pressure, the stress on the blades of the engine will also be non-uniform, because the blades of a turbine engine are rotating and acting on the introduced air. This stress on the engine causes blade shape deformation, which may further deteriorate the engine and cause the engine to run inefficiently. Uniform pressure around a turbine engine inlet will assure that the flow of air into the engine is constant and uniform, and will reduce engine stress while increasing engine efficiency.

Accordingly, an object of the present invention is to provide an apparatus that may cause fluid pressure in one region to equalize with the pressure in another region.

It is a further object of the present invention to provide an apparatus for equalizing the pressure of air around the inlet duct of a turbine engine.

Still another object of the present invention is to provide a method for equalizing the pressure of air around the inlet duct of a turbine engine.

All publications and references cited herein are hereby incorporated into this specification by reference thereto.

SUMMARY OF THE INVENTION

In accordance with these and other objects of the present invention, an apparatus is provided comprised of a means for detecting and regulating the pressure in a first flow area, said first flow area separated from an adjacent second flow area by a surface or wall containing a plurality of perforations. A method for regulating the fluid pressure in said second flow area is also provided, said method comprised of controllably regulating the fluid pressure in said first flow area and permitting fluid to freely flow between said flow areas through said perforations in said surface or wall.

This apparatus and method provides a simple and efficient means to assure pressure equalization in the air around the circumference of the inlet duct of a turbine engine, and thereby reduce or eliminate aerodynamic distortions at said inlet duct.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
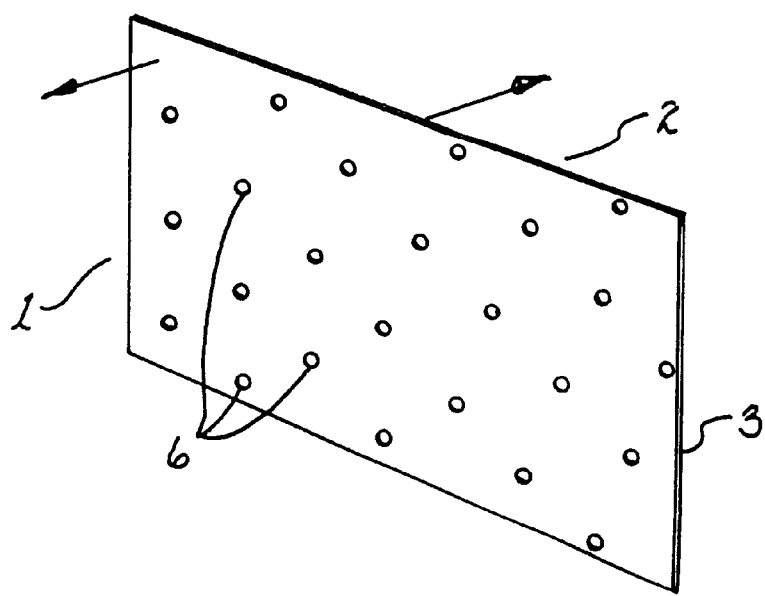
FIG. 1 is a simple plan view of a perforated surface or wall of the present invention.
Figure 2:
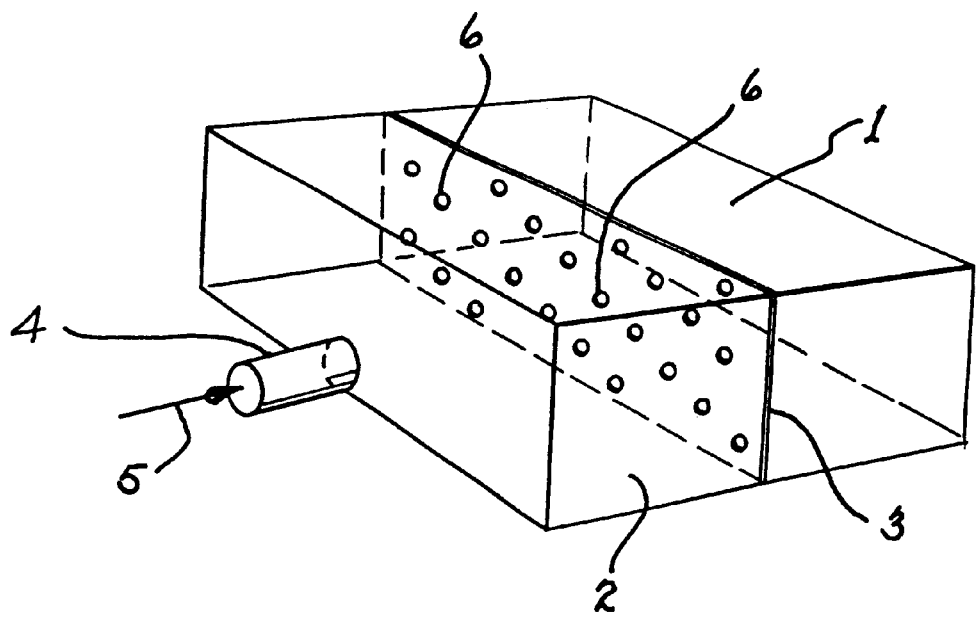
FIG. 2 is a more detailed view of a first flow area and a second flow area of the present invention.

The present invention relates to affecting the fluid pressure in one region by selectively controlling the fluid pressure in another adjoining region, said regions separated by a perforated surface or wall. The concept of the present invention is best illustrated in FIG. 1 and FIG. 2. FIG. 1 shows two fluid flow areas—region 1 is the flow of interest (i.e., the region which is to be acted upon) called the primary flow region, and region 2 is the flow for modulation purposes (i.e., the region which may be controlled to affect the pressure in the primary flow region) called the modulating flow region. Both primary flow region 1 and modulating flow region 2 are occupied by a common fluid, said fluid either liquid, gas or air.

Surface (or wall) 3 separates primary flow region 1 and modulating flow region 2. Surface 3 is provided with at least one, preferably equally a plurality, of perforations 6. Said perforations 6 may be comprised of small holes or slits, said holes or slits capable of permitting fluid flow between primary flow region 1 and modulating flow region 2.

Referring to FIG. 2, equalization of pressure between primary flow region 1 and modulating flow region 2 is achieved by the exchange of flows through perforations 6 in perforated surface 3. Pressure in modulating flow region 2 is actively controlled by valve 4 (which may be connected to an external high pressure flow source 5), allowing modulating flow region 2 to act as a constant pressure reservoir. One may then affect the fluid pressure in primary flow region 1 by controlling the fluid pressure in modulating flow region 2. Fluid mass will flow into primary flow region 1 near a perforation 6 where the pressure in modulating flow region 2 is greater than that in primary flow region 1. In contrast, fluid mass will flow from primary flow region 1 into modulating flow region 2 near a perforation 6 where the pressure in modulating flow region 2 is less than that in primary flow region 1. If one provides a constant pressure throughout modulating flow region 2, fluid will either enter or exit primary flow region 1 through perforations 6 (depending on the pressure differences between region 1 and region 2 at any given perforation 6) until an equal pressure is achieved in primary flow region 1.

Figure 3:
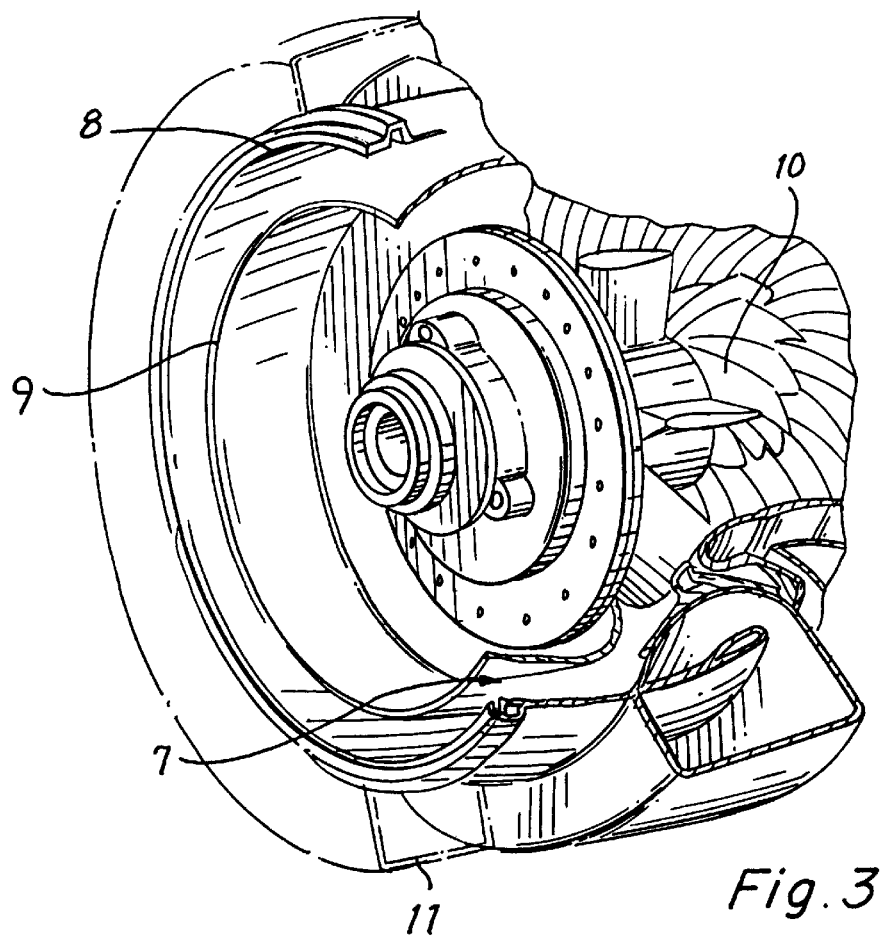
FIG. 3 is a partial exploded view of a turbine engine showing the inlet duct area.

This method of achieving an equal measure of pressure throughout primary region 1 is one way in which to address the problem of turbine engine stall or surge discussed above. One cause of turbine engine surge or stall is aerodynamic distortions (especially at the air inlet). These distortions are characterized by air pressure differences in the area surrounding the air inlet of a turbine engine. FIG. 3 shows a partial exploded view of a turbine engine, and specifically air inlet 7. Air inlet 7 is formed by the outer casing (or wall) 8 of the turbine engine and an inner barrier 9. Outer casing 8 and inner barrier 9 form air inlet 7, through which air flows into compressors 10 of the engine. It is in this air inlet 7 that, if the pressure around the circumference of the inlet is not equal, aerodynamic distortions may occur and cause engine surge or stall. This is because the air entering the compressors 10 of the engine is not equal in pressure and will exert unequal forces on the compressor blades. This not only decreases engine performance and reliability, but also decreases engine and fuel efficiency. By using the method of the present invention, one may equalize the pressure of the air entering through inlet 7 and thereby increase engine efficiency and decrease the probability of engine surge or stall.

Figures 5A, 5B:
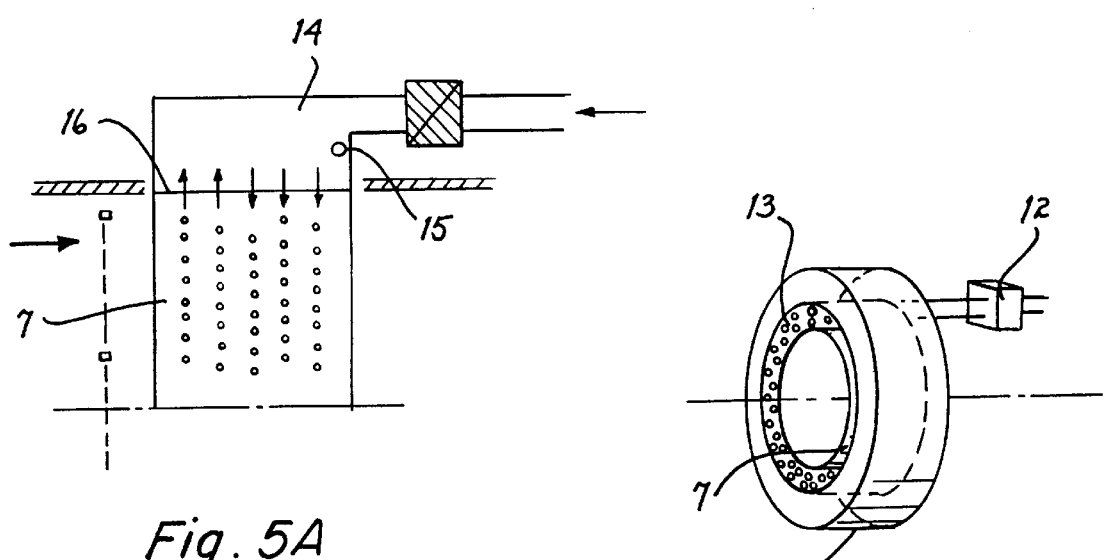
FIG. 5A is a sectional side view of an inlet duct of a turbine engine incorporating an embodiment of the present invention.
FIG. 5B is a diagram depicting a turbine engine inlet duct incorporating the present invention.

FIG. 5B shows a simplified diagram of one application of the present invention to the air inlet on a turbine engine. Inlet 7 flow distortions may be suppressed by wrapping pressure modulating plenum 11 around air inlet 7 of a turbine engine. Pressure modulating plenum 11 forms modulating flow region 2 described above. Primary flow region 1, as applied to the turbine engine, is actually the flow of air into air inlet 7. This plenum may be a hollow annulus surrounding air inlet 7. Pressure modulating plenum 11 is adjacent to, and may be contiguous with, air inlet 7.

Figure 4:
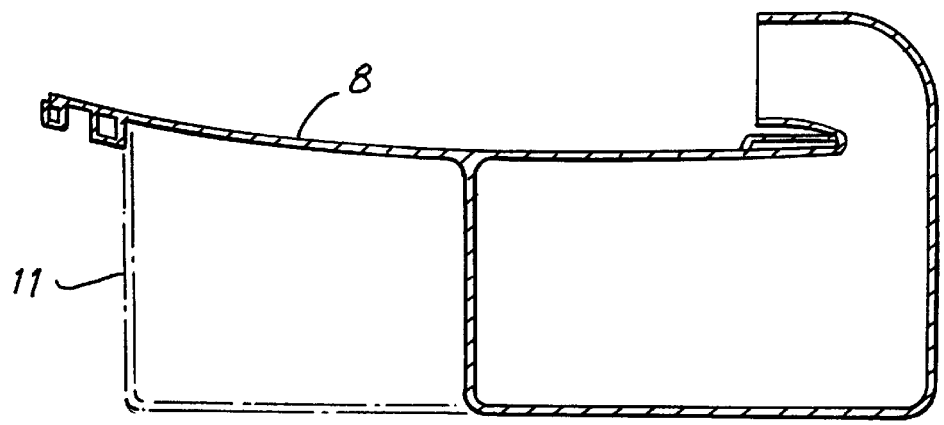
FIG. 4 is a cross sectional view of an air plenum surrounding the inlet of a turbine engine.

Pressure modulating plenum 11, surrounding air inlet 7, is provided with a means for permitting flow between the interior of pressure modulating plenum 11 and the air flowing through air inlet 7. This means may be in the form of perforations through a common wall shared by pressure modulating plenum 11 and air inlet 7. Referring back to FIG. 3, and to FIG. 4, said pressure modulating plenum 11 may be provided surrounding air inlet 7 exterior of outer wall 8. Outer wall 8 may act as a common wall for air inlet 7 and pressure modulating plenum 11, with perforations provided in outer wall 8 to provided fluid (air) flow between pressure modulating plenum 11 and air inlet 7.

The interior space 14 (FIG. 5A) of pressure modulating plenum 11 is provided with at least one plenum pressure sensor 15 to monitor the pressure inside plenum 11. For example, a static pressure sensor used at the inlet of most aircraft engines may be utilized in the present invention. Ideally, a plurality of pressure sensors 15 are provided dispersed around the interior of plenum 11 at varying intervals to measure the pressure around plenum 11.

The air pressure of interior space 14 of pressure modulating plenum 11 is actively controlled by a means for providing high pressure fluid flow into pressure modulating plenum 11, or relieving the pressure in plenum 11 by discharging fluid out of plenum 11. Said means for high-pressure fluid may be a regulating valve 12 capable of regulating airflow from a source of high-pressure air (e.g., from a compressor or from the interior space of a turbine engine). Valve 12 is connected to pressure sensors 15 via a means to permit communication between the two.

Therefore, if pressure sensor 15 detects a drop in pressure in plenum 11, a message is sent to valve 12 to permit introduction of high-pressure air into pressure modulating plenum 11. Conversely, if pressure sensor 15 detects an increase in pressure in plenum 11, a message is sent to valve 12 to permit discharge of air out of modulating plenum 11.

The pressure inside pressure modulating plenum 11 is controlled to a value approximately equal to the averaged value of the measured airflow pressures at a number of locations in inlet duct 7. The air pressure may be determined at several locations around air inlet 7 and averaged to determine the average air pressure entering a turbine engine. This pressure would then be the pressure actively kept in pressure modulating plenum 11.

FIG. 5A depicts a side view of a portion of air inlet 7. Air flows through inlet 7 as shown. Surrounding air inlet 7 is pressure modulating plenum 11, separated from inlet 7 by a perforated wall 16. The interior 14 of plenum 11 is maintained at a constant pressure P, which is the average of measured airflow pressures at a number of locations around inlet 7. As air flows into air inlet 7, if the pressure of the air is lower than that in pressure modulating plenum 11, air will flow out of pressure modulating plenum 11 through perforated wall 16 and into the air flow. If the air flowing into air inlet 7 is greater than that in pressure modulating plenum 11, air will flow through perforated wall 16 and into plenum 11. This way, the air pressure of the air entering inlet 7 will be maintained as closely as possible to the air pressure maintained in plenum 11, and will reduce any aerodynamic distortions around the circumference of air inlet 7. This will reduce or eliminate the occurrence of turbine engine surge or stall.

Figure 6A:
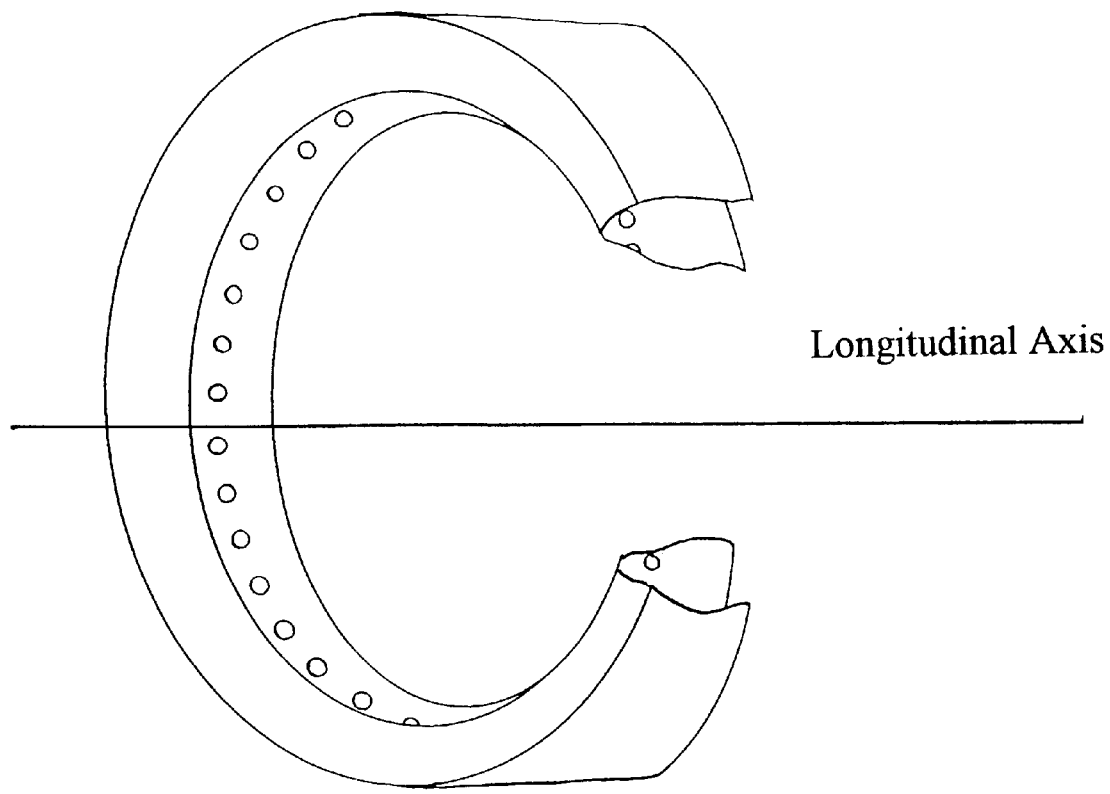
FIGS. 6A and 6B is an illustration of a plenum with rings of perforations.
Figure 6B:
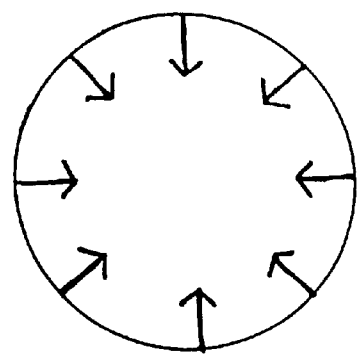

While the perforations 6 may be placed in any position on the perforated surface 3, in one embodiment the perforations equally and radially spaced about the longitudinal axis of plenum 11, as illustrated in FIG. 6, thereby forming at least one ring of perforations 6. In this embodiment, it is preferred that there are more than one ring of perforations 6, with the multiple rings equally spaced apart and longitudinally separated. The multiple rings of perforations 6 may be situated such that the perforations 6 in adjacent rings are either longitudinally aligned or slightly rotated such that the perforations 6 in adjacent rings form diagonals with respect to the longitudinal axis.

Figure 7A:
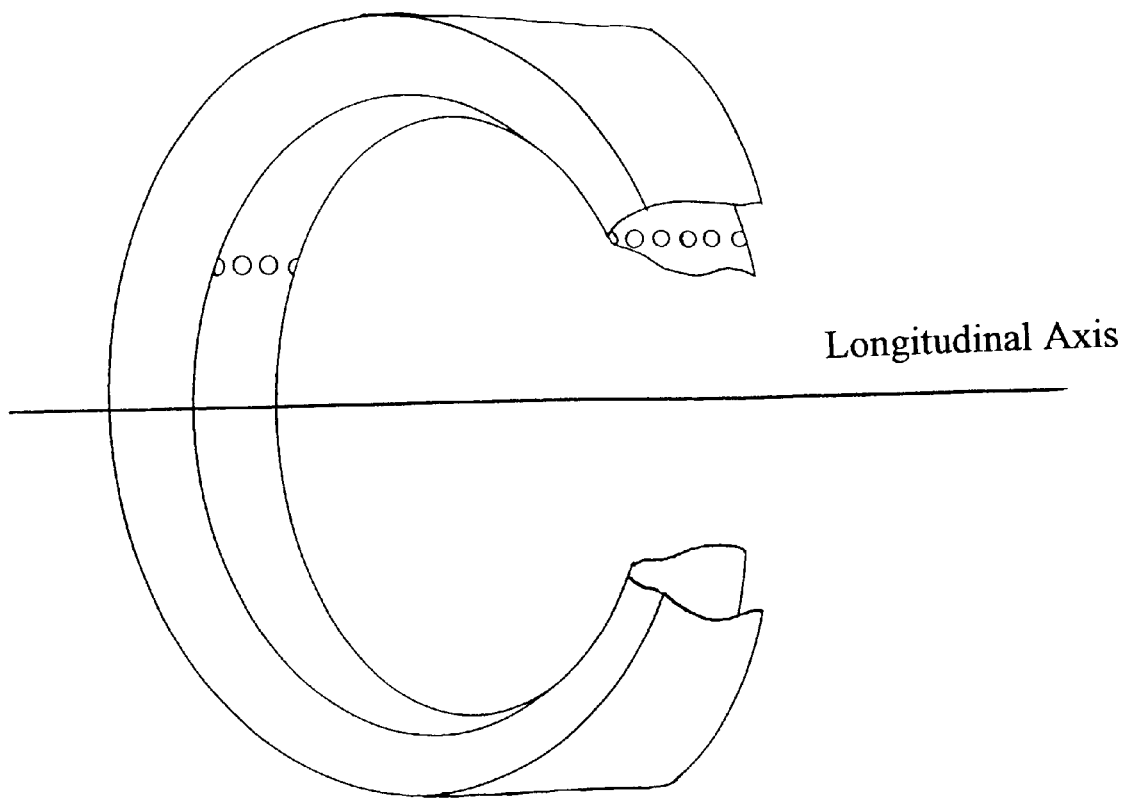
FIGS. 7A and 7B is an illustration of a plenum with lines of perforations.
Figure 7B:
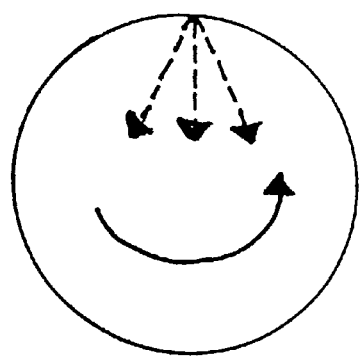

In another embodiment, the perforations 6 may be placed in at least one longitudinally aligned row, as illustrated in FIG. 7, thereby forming at least one line of perforations 6. In this embodiment, it is preferred that there are more than one line of perforations 6, with the multiple lines equally spaced apart and radially separated. The multiple lines of perforations 6 may be situated such that the perforations 6 in adjacent lines are either radially aligned and form rings about the radial axis or slightly off-set in the longitudinal direction such that the perforations 6 in adjacent lines form diagonals with respect to the longitudinal axis. Multiple lines are preferred, with a preferred minimum being between four and eight lines.

It can easily be seen that the two embodiments described above quickly become the same as the number of rings or lines is increased.

Additionally, it is preferred that the perforations 6 should be canted such that air flow into or out of the perforations is either longitudinally, such along or against the direction of the airflow, or radially, such as directed along the curvature of the plenum 11; instead of perpendicular to air flow as would be the case with perpendicularly aligned perforations 6. (Herein the term perpendicular means perpendicular to the longitudinal axis of the plenum 11.) The canting of the perforations 6 can be either uniform in one direction or it can be alternating such that adjacent lines of perforations 6 or rings of perforations 6 are canted in alternate radial or longitudinal directions. This would allow the fluid to flow into one directed set of perforations 6 and out of the other directed set of perforations 6. It is preferred, at the time of application, that the canting be directed in the longitudinal direction and directed along the air flow direction.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method of equalizing the air temperature in a turbine engine air inlet, said method comprised of:
   a) providing a modulating plenum adjacent to and surrounding said turbine engine air inlet, said plenum filled with air;
   b) separating said modulating plenum from said turbine engine air inlet with a wall;
   c) providing the wall with a plurality of perforations, wherein at least one of the perforation is canted longitudinally, for permitting air flow between said modulating plenum and said turbine engine air inlet the plurality of perforations further being circumferentially spaced about a longitudinal axis of said plenum thus forming at least one ring of perforations;
   d) regulating pressure of the air in said modulating plenum,
   e) providing at least one air temperature sensor in said modulating plenum to monitor the temperature inside said plenum; and
   f) maintaining the air temperature in said modulating plenum at a determined temperature.

2. The method of claim 1 wherein at least one ring of perforations is canted longitudinally.

3. The method of claim 2 wherein all rings of perforations are canted longitudinally.

4. A method of equalizing the air temperature in a turbine engine air inlet, said method comprised of:
   a) providing a modulating plenum adjacent to and surrounding said turbine engine air inlet, said plenum filled with air;
   b) separating said modulating plenum from said turbine engine air inlet with a wall;

c) providing the wall with a plurality of perforations, wherein at least one perforation is canted radially, for permitting air flow between said modulating plenum and said turbine engine air inlet the plurality of perforations further being circumferentially spaced about a longitudinal axis of said plenum thus forming at least one ring of perforations;

d) regulating temperature of the air in said modulating plenum, e) providing at least one air temperature sensor in said modulating plenum to monitor the temperature inside said plenum; and f) maintaining the air temperature in said modulating plenum at a determined temperature.

5. The method of claim 4 wherein at least one ring of perforations is canted longitudinally.

6. The method of claim 5 wherein all rings of perforations are canted longitudinally.

7. An apparatus for equalizing the air temperature in a turbine engine air inlet comprising:

a) a modulating plenum located adjacent to and surrounding the turbine engine air inlet wherein the modulating plenum is filled with air;

b) an air te regulator coupled to the modulating plenum for regulating air temperature in the modulating plenum;

c) an air temperature monitoring device coupled to the modulating plenum for monitoring the air temperature in the modulating plenum;

d) a permissive air flow divider located between the modulating plenum and the turbine engine air inlet for defining an air flow region in the modulating plenum and an air flow region in the turbine engine air inlet wherein the air flow divider permits air flow between the air flow regions and includes a plurality of perforations, where at least one of said perforations is canted longitudinally and said perforations are circumferentially spaced about a longitudinal axis of said plenum thus forming at least one ring of perforations; and e) an air temperature maintenance system coupled to the modulating plenum for maintaining the air temperature in the modulating plenum at a determined temperature.

8. The apparatus of claim 7 wherein at least one ring of perforations is canted longitudinally.

9. The apparatus of claim 8 wherein all rings of perforations are canted longitudinally.

10. An apparatus for equalizing the air temperature in a turbine engine air inlet comprising:

a) a modulating plenum located adjacent to and surrounding the turbine engine air inlet wherein the modulating plenum is filled with air;

b) an air temperature regulator coupled to the modulating plenum for regulating air temperature in the modulating plenum;

c) an air temperature monitoring device coupled to the modulating plenum for monitoring the air temperature in the modulating plenum;

d) a permissive air flow divider located between the modulating plenum and the turbine engine air inlet for defining an air flow region in the modulating plenum and an air flow region in the turbine engine air inlet wherein the air flow divider permits air flow between the air flow regions and includes a plurality of perforations, where at least one of said perforation is canted radially and said perforations are circumferentially spaced about a longitudinal axis of said plenum thus forming at least one ring of perforations; and e) an air temperature maintenance system coupled to the modulating plenum for maintaining the air temperature in the modulating plenum at a determined temperature.

11. The apparatus of claim 10 wherein at least one ring of perforations is canted radially.

12. The apparatus of claim 11 wherein all rings of perforations are canted radially.

* * * * *